Figure 1:
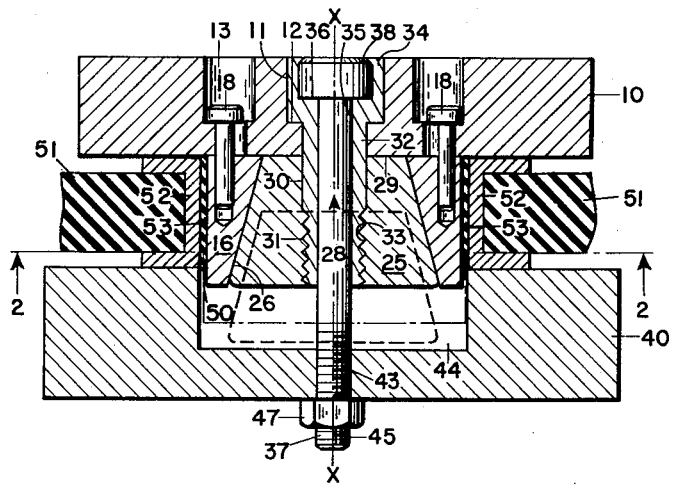

Nov. 6, 1956    W. M. WOOD    2,769,203
VULCANIZING MOLD HAVING AN ADJUSTABLE CORE
Filed March 30, 1953

INVENTOR.
WILLIAM M. WOOD
BY *F. J. Schmitt*
*Max Geldin*
ATTORNEYS

United States Patent Office 2,769,203
Patented Nov. 6, 1956

2,769,203

VULCANIZING MOLD HAVING AN ADJUSTABLE CORE

William M. Wood, San Diego, Calif.

Application March 30, 1953, Serial No. 345,748

8 Claims. (Cl. 18—45)

(Granted under Title 35, U. S. Code (1952), sec. 266)

The invention described herein may be manufactured and used by or for the Government of the United States of America for governmental purposes without the payment of any royalties thereon or therefor.

The present invention relates to a vulcanizing mold having an adjustable core and more particularly to a vulcanizing mold having an adjustable core wherein the core is formed of a plurality of segments, the position of which may be selectively adjusted.

The present invention is adapted for use in vulcanizing rubber upon any type of member having a cylindrical opening extending therethrough and particularly when it is desired to vulcanize rubber upon the inner periphery of the opening. For example, aircraft fuel cells employ a circular fitting having a cylindrical opening extending therethrough, the inner periphery of the opening having a coating of rubber thereon which serves as a sealing means in conjunction with other members utilized therewith. Due to corrosion and wear, this rubber coating must be repaired from time to time by vulcanizing a new supply of rubber upon the inner periphery of the cylindrical opening in order that an effective seal may be maintained. When prior art vulcanizing molds are used, uncured rubber is placed upon the inner periphery of the opening in the fitting and a core of fixed diameter is forced through the opening prior to vulcanization. This procedure is disadvantageous in that some of the uncured rubber is forced from the fitting, and the uncured rubber is accordingly unevenly distributed upon the inner periphery of the opening. Furthermore, in order to successfully vulcanize the new rubber to the fitting, it is necessary to subject the uncured rubber to a large pressure, and it is difficult to develop such pressure upon the uncured rubber when a core of fixed diameter is forced through the opening in the fitting. As a result, it is often necessary to repeat the vulcanizing process in order to obtain a satisfactory repair.

The present invention utilizes a mold having a core formed of a plurality of segments which may be moved relative to one another in such a manner that the effective outer diameter of the core may be varied. The effective outer diameter of the core may accordingly be reduced to its minimum value and the core may then be extended through the opening in the member to be vulcanized, and since the mold may be so adjusted that the effective outer diameter of the core is substantially less than the diameter of the opening, none of the uncured rubber will be forced from the fitting. Once the core is in place relative to the fitting, the segments may again be moved relative to one another, expanding the core to its maximum outer diameter, and due to the wedging action employed in the present invention, a large pressure may be applied to the rubber on the inner periphery of the opening, thereby insuring a satisfactory repair upon vulcanization.

An object of the present invention is the provision of a new and novel mold particularly adapted for vulcanizing rubber on the inner periphery of a cylindrical opening in a member.

Another object is to provide a vulcanizing mold in which the effective outer diameter of the core thereof may be selectively varied.

A further object of the invention is the provision of a vulcanizing mold adapted to apply a large pressure to the rubber on the inner periphery of a cylindrical opening.

Still another object is to provide a vulcanizing mold which is simple in construction, yet sturdy and reliable in operation.

Figure 2:
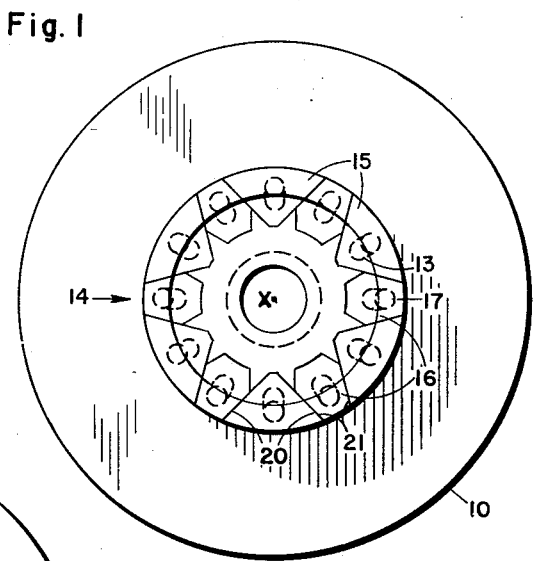
Figure 3:
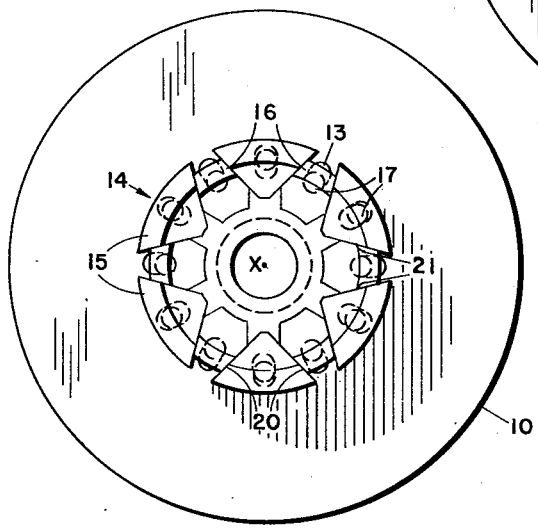

Other objects and many of the attendant advantages of this invention will be readily appreciated as the same becomes better understood by reference to the following detailed description when considered in connection with the accompanying drawing wherein:

Fig. 1 shows a longitudinal section of a preferred embodiment of the invention for vulcanizing an insert fitting of a fuel cell a portion of which is illustrated, Fig. 2 is a view taken along the line 2—2 in Fig. 1 looking in the direction of the arrows, showing the core segments in extended position with certain members omitted, and Fig. 3 is a view similar to Fig. 2 showing the core segments in retracted position.

Referring now to the drawing wherein like reference characters designate like or corresponding parts throughout the several views, there is shown in Fig. 1 a support member 10 having an opening 11 extending longitudinally therethrough, the inner periphery of the opening being stepped so as to form a shoulder 12. Member 10 has a plurality of radially extending slots 13 formed therein, the lower portion of the slots being of less length and width than the upper portion of the slots as will be hereinafter more fully explained.

Referring to Figs. 2 and 3, the core member is indicated generally by reference numeral 14 and consists of a plurality of segments comprising a first group of members 15 and a second group of members 16. Each of the segments has a pin member 17 suitably secured thereto, and the pin extends through the lower portions of slot 13 as may be more clearly seen in Fig. 1. Each of the pins 17 has an enlarged head 18 formed at the upper end thereof which fits within the enlarged upper portions of slot 13. Considering the radial dimensions of the slots to be the lengthwise dimensions thereof, it may be seen that the upper portion of the slots has a length greater than that of the lower portion, whereby the pins 17 are adapted to travel to the opposite ends of the lower portion of the slots while heads 18 travel to the opposite ends of the upper portion. It is evident that the ends of the slots limit the inner and outer radial movements of the core segments. The lower portions of the slots have a width slightly greater than the diameter of the pins 17, yet considerably less than the width of the heads 18 whereby the pins and core segments may not move longitudinally with respect to member 10 and yet are radially movable relative thereto. It should be noted that support member 10, opening 11, and slots 13 are disposed symmetrically about the longitudinal axis X—X of member 10.

As may be clearly seen in Fig. 3, members 15 and 16 have cooperating surfaces 20 and 21 respectively formed thereon and these surfaces are suitably inclined to one another such that upon outward movement of members 16, members 15 are also forced radially outward, and a powerful wedging action is developed. In the present example, the angle between surfaces 20 and 21 and the radial direction from longitudinal axis X—X is 15°.

It should be noted that when segments 15 and 16 are at their outer limit of travel as shown in Fig. 2, the outer peripheries of the segments cooperate to form a continuous cylindrical core member.

A cam member 25 is positioned adjacent the inner peripheries of segments 15 and 16, and as may be seen in Fig. 1, the outer periphery of member 25 forms a sloping cam surface 26 which is adapted to engage correspondingly sloped cam surfaces 27 formed on the inner periphery of members 16, whereby upon longitudinal movement of member 25 in the direction of arrow 28 in Fig. 1, members 15 and 16 will be forced to their outer limit of travel as defined by the radially outward ends of slots 13.

The cam member is so shaped and dimensioned that when members 15 and 16 are positioned at their outer limits of travel, the upper surface 29 of member 25 seats upon the lower surface 42 of member 10 as may be seen in Fig. 1. This feature prevents excessive radial movement of members 15 and 16 by member 25, and thereby protects the mold from possible damage which might occur if the core segments were over-expanded.

Cam member 25 has an opening 30 extending longitudinally therethrough, and the opening has screw threads 31 formed on the inner periphery of one end thereof. A bolt member 32 extends through openings 11 and 30, and has screw threads 33 formed on the outer periphery thereof adapted to mesh with threads 31 whereby the longitudinal position of the cam member may be adjusted by rotating bolt 32 with respect to member 25. Bolt member 32 has a head 34 formed thereon, the lower surface of the head being adapted to seat upon shoulder 12. Member 32 has an opening 35 extending longitudinally therethrough, which is stepped to form a shoulder 36 on the inner periphery thereof. A bolt member 37 extends through opening 35 and has a head 38 formed at one end thereof, the lower surface of the head 38 being adapted to seat upon shoulder 36.

A clamping member 40 is positioned opposite support member 10, and the upper surface 41 of member 40 is disposed parallel to the lower surface 42 of member 10. Member 40 has a centrally located aperture 43 extending therethrough which opens into a cylindrically shaped cavity 44 formed in member 40. Member 40, aperture 43, and cavity 44 are disposed symmetrically about longitudinal axis X—X and member 40 is positioned such that cavity 44 opens toward member 10.

Bolt 37 extends through opening 43 and has screw threads 45 formed at the end thereof which are adapted to mesh with corresponding screw threads formed on the inner periphery of a conventional nut 47. It is evident that by advancing nut 47 upwardly along bolt 37, member 40 will be forced toward member 10. In this manner, an aircraft fuel cell 51 having an insert ring fitting 52 provided with a layer of uncured rubber 53 on the inner periphery of the fitting to be vulcanized may be securely clamped in place within the mold.

As may be seen in Fig. 1, wherein the core segments are at their outer limit of travel, a small clearance 50 exists between the outer periphery of the core segments and the inner periphery of cavity 44, whereby during a vulcanizing operation, the excess molten rubber of layer 53 on the fitting to be vulcanized may flow into the cavity. This clearance may preferably be quite small and may be on the order of .005 inch in a mold in which the diameter of member 40 is four and one-half inches. Clearance 50 and cavity 44 comprise an additional feature of the invention since any excess rubber can flow from the fitting and yet the fitting can be securely clamped within the mold.

It should be noted that the dimensions of core segments 15 and 16 along the longitudinal axis of the mold are greater than the depth of the fitting to be vulcanized such that when clamping member 40 is in clamping position, the segments will extend into cavity 44 in member 40, thereby insuring that the core segments will exert a substantially constant pressure against all portions of the inner periphery of the opening in the fitting.

It should be understood that the present invention is adapted to be used with any type of fitting having an opening extending therethrough and that for the purpose of illustration, the mold is shown as being particularly adapted for use with a circular aircraft fuel cell fitting having a cylindrical opening extending therethrough. The fittings to be vulcanized in the present examples are flattened ring-like members having a centrally located opening therein, the diameter of the opening being substantially the same as that of the outer periphery of the core member when the segments are in the position shown in Fig. 2. As pointed out previously, a coating of rubber on the inner periphery of the opening in the fitting serves as a sealing means when the fitting is utilized with aircraft fuel cells 51.

The operation of the device is as follows: The fitting 52 is first prepared for vulcanization by applying uncured rubber 53 to that portion of the inner periphery of the opening in the fitting which is to be repaired. The mold is then disassembled by removing nut 47 from bolt 37 whereupon member 40 is slidably removed from bolt 37, and bolt 37 is in turn slidably removed from opening 35. By actuating bolt 32 in the proper direction, cam member 25 is urged in a downward direction into the dotted line position indicated in Fig. 1 whereupon segments 15 and 16 may be manually urged radially inward until the pins fixed to members 16 abut against the inner ends of slots 13 and the pins fixed to members 15 are disposed at an intermediate position in the slots as shown in Fig. 3. As may be seen in Fig. 3, the effective outer diameter of the core as defined by the outer peripheries of members 15 is reduced and the core segments may be easily inserted within the opening in the fitting.

The fitting is then placed upon the mold with the core segments extending through the opening in the fitting. Bolt member 32 is then rotated in such a direction as to cause member 25 to move upwardly as indicated by arrow 28 in Fig. 1 whereby cam surface 26 cooperates with cam surfaces 27 to force members 16 radially outward. Surfaces 20 and 21 on core segments 15 and 16 respectively cooperate to also urge members 15 radially outward. Member 32 is rotated until the core segments have been advanced to their outer limit of travel, i. e. until pins 17 reach the outer end of slots 13, whereupon the segments are in the position shown in Fig. 2, and a large pressure is applied to the uncured rubber on the inner periphery of the opening of the fitting due to the wedging action developed by surfaces 20 and 21.

Bolt 37 is then inserted in opening 35 such that the lower surface of head 38 seats on shoulder 36, and clamping member 40 is slidably positioned adjacent the core segments with bolt 37 passing through opening 43 in member 40. Nut 47 is then threaded onto the end of bolt 37 and member 40 is advanced toward member 10 until the fitting is securely clamped between surfaces 41 and 42.

The mold and fitting are then subjected to sufficient heat to complete the vulcanizing process, and any excess molten rubber which may flow into cavity 44 during vulcanization is removed subsequent to the operation.

Since the effective outer diameter of the core is reduced prior to insertion in the opening in the fitting, none of the uncured rubber is forced out of the fitting during assembly prior to vulcanization. Furthermore, due to the wedging action of the core segments, a large pressure is applied to the uncured rubber, thereby insuring a satisfactory repair without the necessity of repeating the vulcanizing process.

It is apparent from the foregoing that there is provided a new and novel vulcanizing mold which is particularly adapted for vulcanizing rubber on the inner periphery of a cylindrical opening in a member, and wherein the effective outer diameter of the core of the mold may be selectively varied. The mold is adapted to exert a large pressure on the rubber on the inner periphery of an opening, and the mold is simple in construction yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. In combination, a support means, a core means formed of a plurality of segments slidably mounted on said support means, said segments having an outer limit of travel, cam means adapted to engage certain of said segments and thereby force said segments to their outer limit of travel, means to selectively actuate said cam means, clamping means positioned adjacent said segments with a relatively small clearance therebetween when said segments are at their outer limit of travel, and means for securing said clamping means in clamping position.

2. A vulcanizing mold which comprises a support means having radially extending slots formed therein, core means formed of a plurality of segments, each of said segments having pin means connected thereto, said pin means being slidably supported in said slots, the radially inner and outer peripheries of said slots serving respectively to limit the inner and outer travel of said segments, cam means positioned adjacent the inner peripheries of said segments and adapted to engage certain of said segments whereby the relative position of said segments and said support means is variable, means for actuating said cam means, means for limiting the movement of said cam means in one direction of travel thereof, clamping means having a cavity formed therein, said segments extending at least partially into said cavity, and means for securing said clamping means in clamping position.

3. The combination as defined in claim 1 wherein each of said plurality of segments has a cam surface adapted to engage a cam surface on an adjacent segment whereby when said certain segments are forced to their outer limit of travel, the remaining segments are also forced to their outer limit of travel.

4. A vulcanizing mold which comprises support means having an opening extending therethrough and slots formed therein, core means formed of a plurality of segments, each of said segments having pin means connected thereto, said pin means being slidably supported in said slots, the ends of said slots serving to limit the travel of said segments, said segments comprising a first and a second group of segments, cam means for moving said first group of segments to its outer limit of travel, said first and second groups of segments having cooperating surfaces formed on the lateral surfaces thereof whereby when said first group of segments is moved to its outer limit of travel said second group of segments will also be moved to its outer limit of travel, means extending through said opening and connected to said cam means whereby said cam means may be selectively actuated, clamping means having a cavity formed therein which opens toward said support means, said segments being disposed at least partially within said cavity with a small clearance between said segments and said clamping means, and means extending through said opening for supporting said clamping means in clamping position.

5. A vulcanizing mold which comprises a support means having a first opening therethrough, said opening extending along the longitudinal axis of said support means, slots formed in said support means and extending radially from said axis, core means formed of a plurality of members, each of said members having pin means connected thereto, said pin means being slidably supported in said slots, the ends of said slots serving to limit the travel of said members, said members being adapted to be positioned such that the outer peripheries thereof cooperate to form a continuous cylindrical surface, the inner peripheries of alternate members having first cam surfaces formed thereon, cam means positioned adjacent said members and having a second cam surface formed thereon, said cam means having a second opening extending longitudinally therethrough, first bolt means extending through said first and second openings and connected to said cam means whereby upon relative rotation between said first bolt means and said cam means in one direction, said cam means is moved along said longitudinal axis and said first and second cam surfaces cooperate to force said members to their outer limit of travel, said cam means engaging said core means when said members are at their outer limit of travel, each of said members having surfaces formed on the lateral portions thereof adapted to cooperate with and engage corresponding surfaces on the members adjacent thereto, said surfaces being inclined at an angle relative to the radial direction from said longitudinal axis, clamping means having a cavity formed therein and opening toward said support means, said members being disposed at least partially within said cavity with a small clearance between said members and said clamping means, and second bolt means extending through said opening for supporting said clamping means in clamping position.

6. A vulcanizing mold which comprises a support member, a core means formed of a plurality of segments slidably mounted on said support member whereby the effective outer diameter of said core means is variable, means for altering the relative position of said segments and said support member, means to selectively actuate said altering means, a clamping member positioned adjacent said segments and spaced from said support member thereby providing a space between said members for receiving a body to be vulcanized, and means for moving said members toward one another and clamping said body therebetween.

7. In a vulcanizing mold, a support member having an opening extending therethrough, a plurality of core segments slidably mounted on said support member, certain of said segments having cam surfaces formed thereon, cam means adapted to engage said surfaces whereby the relative position of said segments and said support member is alterable, means extending through said opening for actuating said cam means, a clamping member positioned adjacent said segments and spaced from said support member thereby providing a space between said members for receiving a body to be vulcanized, and means extending through said opening for moving said members toward one another and clamping said body therebetween.

8. In a vulcanizing mold, a support member, core means formed of a plurality of segments slidably mounted on said support member whereby said segments are movable relative to one another and the effective outer diameter of said core means may be varied, each of said segments having an inner and an outer periphery, said segments being adapted to be positioned such that said outer peripheries cooperate to form a continuous cylindrical surface, certain of said segments having cam surfaces formed on the inner periphery thereof, each of said segments having surfaces formed on the lateral portions thereof adapted to cooperate with and engage corresponding surfaces on the segments adjacent thereto, cam means for moving said segments and being adapted to engage said cam surfaces, means for selectively actuating said cam means, a clamping member positioned adjacent said segments and spaced from said support member thereby providing a space between said members for receiving a body to be vulcanized, and means for moving said members toward one another and clamping said body therebetween.

References Cited in the file of this patent

UNITED STATES PATENTS

| | | |
|---|---|---|
| 946,233 | Lazelere | Jan. 11, 1910 |
| 1,312,157 | Buente | Aug. 5, 1919 |
| 1,394,558 | Klug | Oct. 25, 1921 |
| 1,415,755 | Wright | May 9, 1922 |